United States Patent [19]

Cheng

[11] Patent Number: 5,494,341
[45] Date of Patent: Feb. 27, 1996

[54] WHEEL SHAFT MOUNTING ASSEMBLY FOR A HANDCART

[76] Inventor: Chin-Chang Cheng, No. 20, Lane 327, Sec. 2, Chung Shan Rd., Chung Ho City, Taipei Hsien, Taiwan

[21] Appl. No.: 328,352

[22] Filed: Oct. 24, 1994

[51] Int. Cl.⁶ .................................................. B60B 35/06
[52] U.S. Cl. .......................... 301/111; 301/118; 301/122; 280/47.24; 403/348
[58] Field of Search ................................ 301/111, 118, 301/119, 120, 121, 122, 112; 403/315, 348, 349, 350; 280/47.17, 47.24, DIG. 4

[56] References Cited

U.S. PATENT DOCUMENTS

| | | | |
|---|---|---|---|
| 1,094,046 | 4/1914 | Adams | 301/118 |
| 2,869,885 | 1/1959 | Doyle, Jr. | 280/47.17 |
| 5,029,946 | 7/1991 | Liao | 301/111 |

FOREIGN PATENT DOCUMENTS

| | | | |
|---|---|---|---|
| 1184976 | 7/1959 | France | 301/121 |

*Primary Examiner*—Russell D. Stormer
*Attorney, Agent, or Firm*—Hedman, Gibson & Costigan

[57] ABSTRACT

A wheel shaft mounting assembly for a handcart includes a pair of lug portions each respectively formed on a distal end of a wheel shaft and inserted in a hole defined in a supporting post, a pair of sleeve members each respectively mounted around and slidable on a lower end of the supporting post, an arcuate recess defined in a peripheral portion of each of the sleeve members, a vertical passage defined in the peripheral portion of each of the sleeve members from a free end thereof to a position where the arcuate recess terminates, the arcuate recess communicating with the vertical recess and having a diameter greater than a width of the vertical recess, the wheel shaft having a diameter substantially greater than the width of the vertical recess and substantially less than the diameter of the arcuate recess.

5 Claims, 5 Drawing Sheets

5,494,341

WHEEL SHAFT MOUNTING ASSEMBLY FOR A HANDCART

BACKGROUND OF THE INVENTION

1. Field of Invention

The present invention relates to a wheel shaft mounting assembly, and more particularly to a wheel shaft mounting assembly for a handcart.

2. Related Prior Art

A conventional wheel shaft mounting device for a handcart is shown in FIG. 7. However, by such an arrangement, there are still a few shortcomings in the conventional wheel shaft mounting device.

There will be a more complete and sufficient illustration in the detailed description of the preferred embodiments, concerning the conventional wheel shaft mounting device.

The present invention has arisen to mitigate and/or obviate the above-mentioned disadvantages of the conventional wheel shaft mounting device.

SUMMARY OF THE INVENTION

The primary objective of the present invention is to provide a wheel shaft mounting assembly for a handcart, which is easily assembled and dismantled and has a simple structure.

In accordance with one aspect of the present invention, there is provided a wheel shaft mounting assembly for a handcart which comprises a wheel shaft having two distal ends, a pair of supporting posts each respectively and securely mounted on a corresponding one of the distal ends of the wheel shaft, each of the supporting posts having a hole transversely defined in a lower end thereof, a pair of wheels each respectively and rotatably mounted around a corresponding one of the distal ends of the wheel shaft, the wheel shaft mounting assembly comprising a pair of first lug portions each respectively formed on a corresponding one of the distal ends of the wheel shaft, a pair of second lug portions each respectively formed on a corresponding one of the distal ends of the wheel shaft and positioned diametrically opposite to a corresponding one of the first lug portions, each of the corresponding first and second lug portions being inserted in the hole of a corresponding one of the supporting posts, a pair of sleeve members each respectively mounted around and slidable on the lower end of a corresponding one of the supporting posts, a arcuate recess defined in a peripheral portion of each of the sleeve members, a vertical passage defined in the peripheral portion of each of the sleeve members from a free end thereof to a position where the circular recess terminates, the arcuate recess communicating with the vertical recess and having a diameter greater than a width of the vertical recess, the wheel shaft having a diameter substantially greater than the width of the vertical recess and substantially less than the diameter of the arcuate recess, whereby, each of the sleeve members is able to be forced downwardly along the supporting post to urge the distal end of a corresponding one of the wheel shaft into the arcuate recess through the vertical recess of the sleeve member, each of the first lug portions in the hole of the supporting post is stopped by the sleeve member, thereby preventing the first lug portion from being released from the hole of the supporting post.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 7:
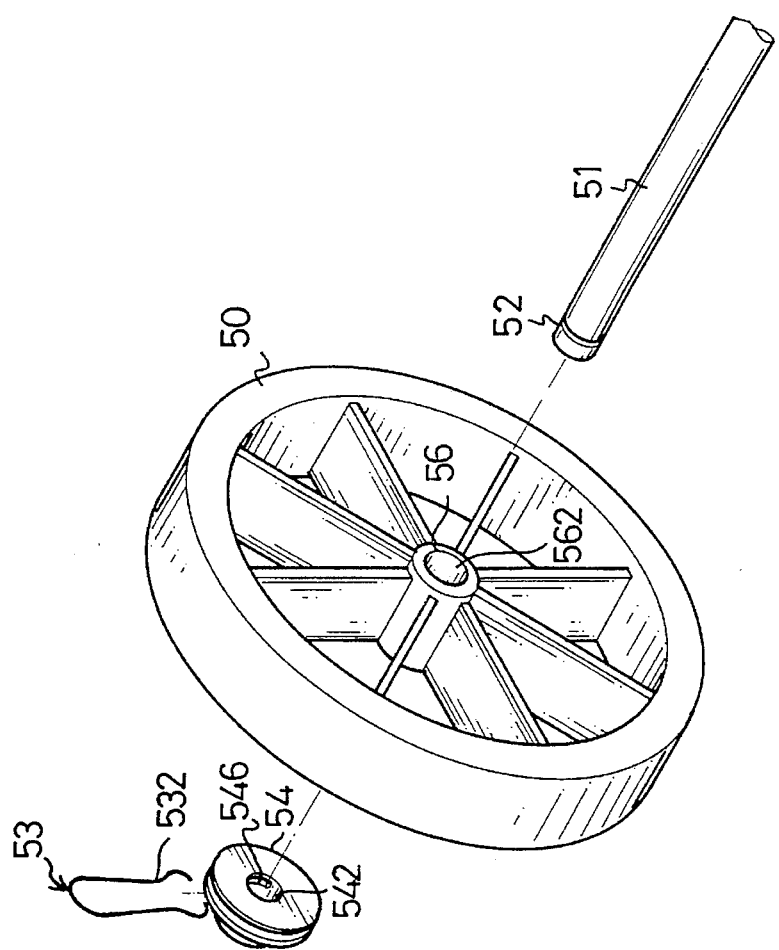
FIG. 7 is an exploded view of a conventional wheel shaft mounting device in accordance with the prior art.

Referring to FIG. 7, a conventional wheel shaft mounting device in accordance with the prior art is provided for a handcart which comprises a wheel 50, a tubular bearing 56 formed on a central portion in the wheel 50, a bore 562 longitudinally defined in the tubular bearing 56, a wheel shaft 51 having a free end extended through the bore 562 of the tubular bearing 56 and disposed outside the tubular bearing 56, a groove 52 defined in a peripheral portion of the free end of the wheel shaft 51, the wheel shaft mounting device comprising a cap 54 which is attached on the free end of the wheel shaft 51 and has a circular recess 542 defined in a central portion thereof for receiving the free end of the wheel shaft 51 therein, a pair of arcuate slots 546 symmetrically defined in a peripheral portion of the cap 54 each communicating with the circular recess 542 and each aligning with the groove 52 of the wheel shaft 51, a locking pin 53 being mounted on the cap 54 and having two snapping legs 532 each extending through a corresponding arcuate slot 546 of the cap 54 and each received and retained in the groove 52 of the free end of the wheel shaft 51 such that the wheel 50 is mounted on the wheel shaft 51. By such an arrangement, it is not easy to push the locking pin 53 to be mounted on the cap 54. In addition, the groove 52 of the wheel shaft 51 is shallow, thereby causing a loose engagement between the snapping legs 532 of the locking pin 53 and the free end of the wheel shaft 51 such that the locking pin 53 is easily detached from the cap 54 when the handcart is pulled over rough terrain, thereby easily allowing the wheel 50 to be detached from the wheel shaft 51, so incurring inconvenience and possibly the danger to the user.

Figure 1:
FIG. 1 is a perspective view of a wheel shaft mounting assembly for a handcart in accordance with the present invention.
Figure 2:
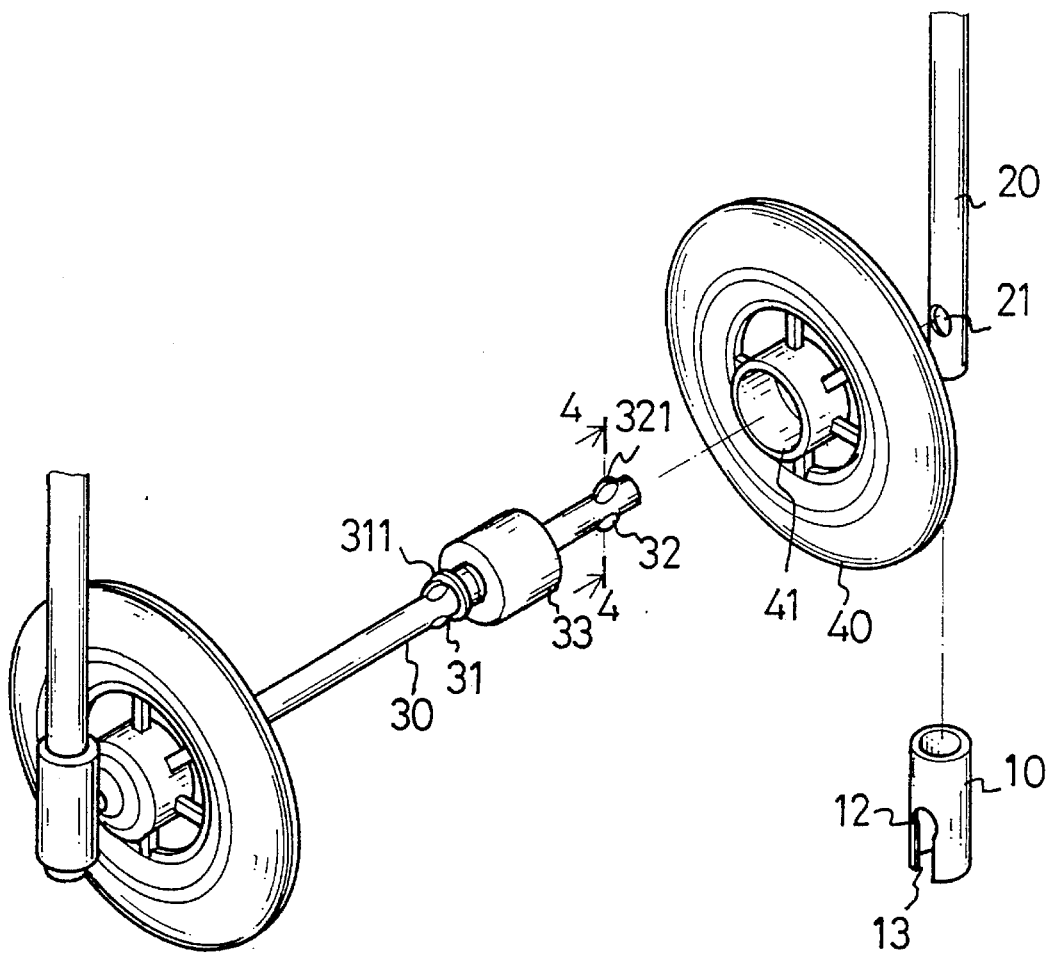
FIG. 2 is a partially exploded view of the wheel shaft mounting assembly as shown in FIG. 1.

Referring to FIGS. 1–6, and initially to FIGS. 1 and 2, a wheel shaft mounting assembly in accordance with the present invention is provided for a handcart which comprises a wheel shaft 30 having two distal ends, a pair of supporting posts 20 each respectively and securely mounted on a corresponding one of the distal ends of the wheel shaft 30, each of the supporting posts 20 having a hole 21 transversely defined in a lower end thereof, each of the holes 21 having an oblong or elongated configuration, a pair of wheels 40 each respectively and rotatably mounted around a corresponding one of the distal ends of the wheel shaft 30.

Figure 3:
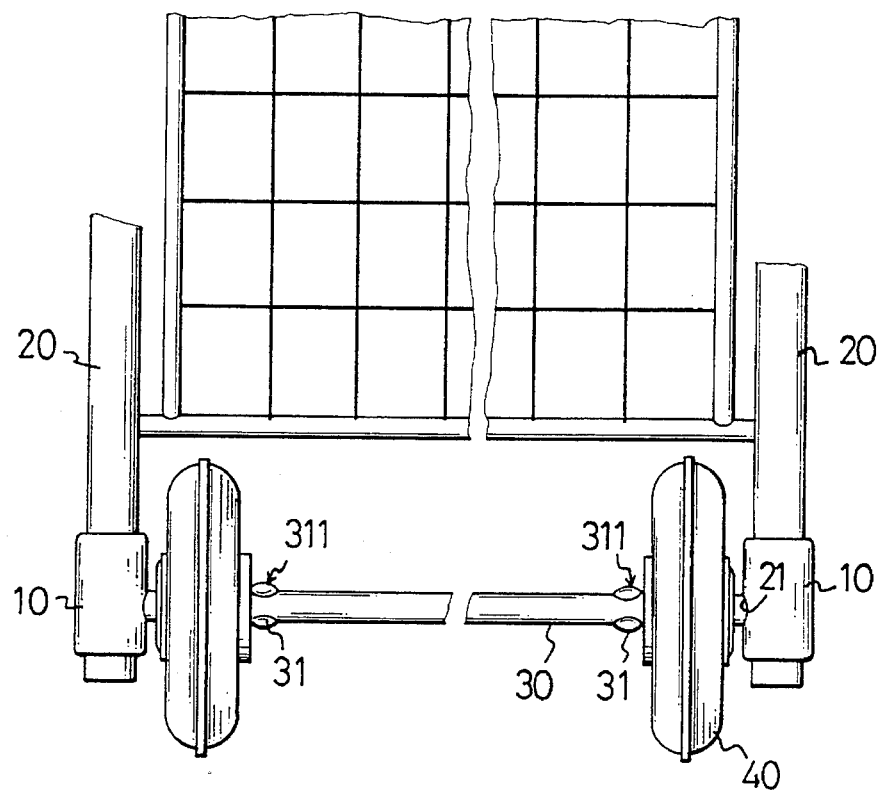
FIG. 3 is a front plan view of the wheel shaft mounting assembly.

Referring to FIGS. 2 and 3, the wheel shaft mounting assembly comprises a pair of first lug portions 321 each respectively formed on a corresponding one of the distal ends of the wheel shaft 30, a pair of second lug portions 32 each respectively formed on a corresponding one of the distal ends of the wheel shaft 30 and positioned diametrically opposite to a corresponding one of the first lug portions 321, each of the corresponding first and second lug portions 321 and 32 being inserted in the hole 21 of a corresponding one of the supporting posts 20, a pair of tubular bearings 33 each rotatably mounted around a corresponding one of the distal ends of the wheel shaft 30, each of the wheels 40 comprising a hub 41 formed on a central portion therein which is securely fitted on a corresponding one of the tubular bearings 33, a pair of first stubs 311 each formed on the wheel shaft 30 and located adjacent to a corresponding one of the bearings 33 for limiting slidable movement and inward offset of the bearings 33, a pair of second stubs 31 each formed on the wheel shaft 30 and located diametrically opposite to a corresponding one of the first stubs 311 and having a function the same as that of the first stub 311.

Figure 4:
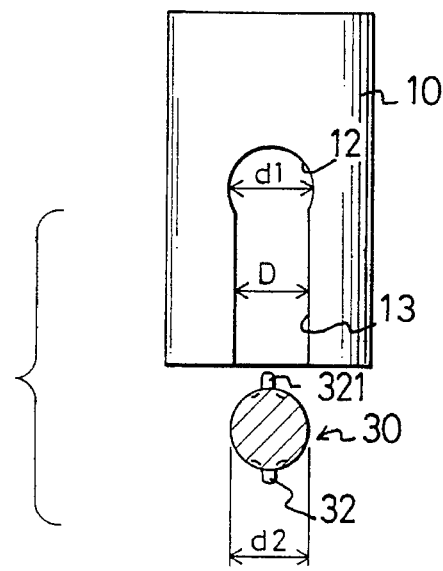
FIG. 4 shows a relation between a sleeve member and a wheel shaft.

Referring to FIGS. 2 and 4, a pair of sleeve members 10 each are respectively mounted around and slidable on the lower end of a corresponding one of the supporting posts 20, an arcuate recess 12 is defined in a peripheral portion of each of the sleeve members 10, a vertical passage 13 is defined in the peripheral portion of each of the sleeve members 10 from a free end thereof to a position where the arcuate recess 12 terminates, the arcuate recess 12 communicating with the vertical recess 13 and having a diameter (d1) greater than a width (D) of the vertical recess 13, the wheel shaft 30 having a diameter (d2) substantially greater than the width (D) of the vertical recess 13 and substantially less than the diameter (d1) of the arcuate recess 12.

Figure 5:
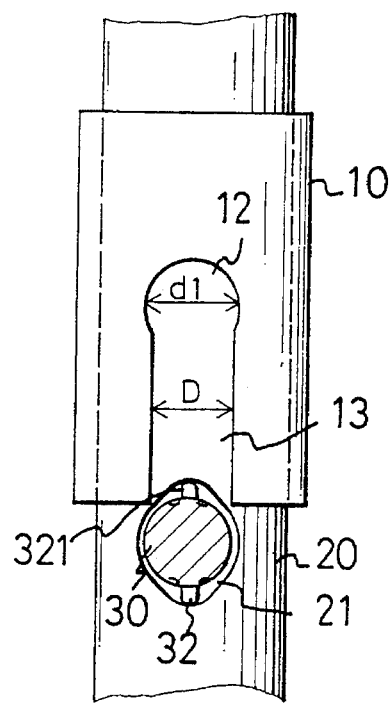
FIG. 5 is an operational view showing a pair of lug portions received in an oblong hole of the supporting post.
Figure 6:
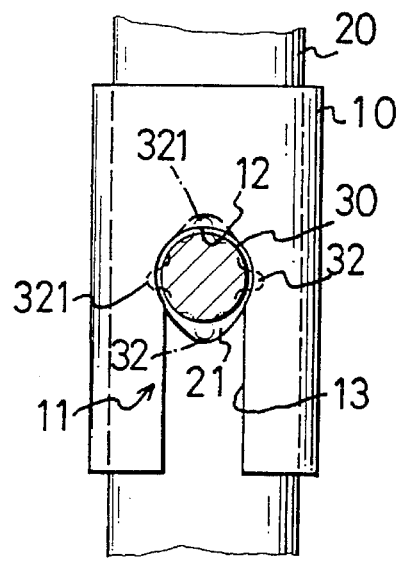
FIG. 6 is an operational view showing the wheel shaft fitted in the sleeve member.

In assembling, referring to FIGS. 5 and 6 in reference to FIG. 2, each of the distal ends of the wheel shaft 30 together with the corresponding first and second lug portions 321 and 32 is inserted into the lower end of the supporting post 20 through the oblong hole 21 (see FIG. 5), each of the sleeve members 10 is subsequently forced downwardly along the supporting post 20 to urge the distal end of the corresponding wheel shaft 30 into the circular recess 12 through the vertical recess 13 of the sleeve member 10 (see FIG. 6), thereby securely fitting the wheel shaft 30 in the arcuate recess 12 of the sleeve member 10, each of the first lug portions 321 in the hole 21 of the supporting post 20 is stopped by the sleeve member 10 (see FIG. 6 in phantom lines), thereby preventing the lug portion 321 from being released from the hole 21 of the supporting post 20. Preferably, the wheel shaft 30 is rotated counterclockwise by 90 degrees such that the first and second lug portions 321 and 32 are both received in the hole 21 of the supporting post 10 (see FIG. 6 in phantom lines), thereby further preventing the first and second lug portions 321 and 32 from being released from the oblong hole 21 of the supporting post 20.

Accordingly, a wheel shaft mounting assembly in accordance with the present invention has the following advantages and benefits:

(1) The wheel shaft is easily fitted to and detached from the supporting post of the handcart by means of downward and upward movement of the sleeve member along the supporting post, so being convenient in assembling and dismantling the wheel shaft.

(2) The wheel shaft mounting assembly is simple in structure, so being convenient in operating.

(3) The wheel shaft mounting assembly requires fewer assembly parts, so largely reducing working process necessary in manufacturing, thereby greatly saving cost in fabrication.

It should be clear to those skilled in the art that further embodiments of the present invention may be made without departing from the teachings of the present invention.

What is claimed is:

1. A wheel shaft mounting assembly for a handcart which comprises a wheel shaft (30) having two distal ends, a pair of supporting posts (20) each respectively and securely mounted on a corresponding one of the distal ends of said wheel shaft (30), each of said supporting posts (20) having a hole (21) transversely defined in a lower end thereof, a pair of wheels (40) each respectively and rotatably mounted around a corresponding one of the distal ends of said wheel shaft (30), said wheel shaft mounting assembly comprising:

a pair of first lug portions (321) each respectively formed on a corresponding one of the distal ends of said wheel shaft (30), a pair of second lug portions (32) each respectively formed on a corresponding one of the distal ends of said wheel shaft (30) and positioned diametrically opposite to a corresponding one of said first lug portions (321), each of said corresponding first and second lug portions (321) and (32) being inserted in said hole (21) of a corresponding one of said supporting posts (20); and a pair of sleeve members (10) each respectively mounted around and slidable on the lower end of a corresponding one of said supporting posts (20), an arcuate recess (12) defined in a peripheral portion of each of said sleeve members (10), a vertical passage (13) defined in the peripheral portion of each of said sleeve members (10) from a free end thereof to a position where said arcuate recess (12) terminates, said arcuate recess (12) communicating with said vertical recess (13) and having a diameter greater than a width of said vertical recess (13), said wheel shaft (30) having a diameter substantially greater than the width of said vertical recess (13) and substantially less than the diameter of said circular recess (12), whereby, each of said sleeve members (10) is able to be forced downwardly along said supporting post (20) to urge the distal end of a corresponding one of said wheel shafts (30) into said arcuate recess (12) through said vertical recess (13) of said sleeve member (10), each of said first lug portions (321) in said hole (21) of said supporting post (20) is stopped by said sleeve member (10), thereby preventing said first lug portion (321) from being released from said hole (21) of said supporting post (20).

2. The wheel shaft mounting assembly in accordance with claim 1, wherein each of said holes (21) has an oblong configuration.

3. The wheel shaft mounting assembly in accordance with claim 1, wherein each of said holes (21) has an elongated configuration.

4. The wheel shaft mounting assembly in accordance with claim 1, further comprising a pair of bearings (33) each rotatably mounted around a corresponding one of the distal ends of the wheel shaft (30), each of said wheels (40) comprising a mount frame (41) formed therein which is securely fitted on a corresponding one of said bearings (33).

5. The wheel shaft mounting assembly in accordance with claim 4, further comprising a pair of first stubs (311) each formed on the wheel shaft (30) and located adjacent to a corresponding one of said bearings (33) for limiting slidable offset of said bearing (33), a pair of second stubs (31) each formed on the wheel shaft (30) and located diametrically opposite to a corresponding one of said first stubs (311).

* * * * *